United States Patent
Jiyun

(10) Patent No.: US 9,153,013 B2
(45) Date of Patent: Oct. 6, 2015

(54) IMAGE PROCESSING APPARATUS, IMAGE PROCESSING METHOD AND COMPUTER READABLE MEDIUM

(71) Applicant: PFU LIMITED, Kahoku-shi, Ishikawa (JP)

(72) Inventor: Du Jiyun, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 144 days.

(21) Appl. No.: 13/919,367

(22) Filed: Jun. 17, 2013

(65) Prior Publication Data

US 2014/0140620 A1    May 22, 2014

(30) Foreign Application Priority Data

Nov. 19, 2012  (JP) ................................. 2012-253269

(51) Int. Cl.
  *G06T 5/00*    (2006.01)
(52) U.S. Cl.
  CPC ....... *G06T 5/002* (2013.01); *G06T 2207/10008* (2013.01); *G06T 2207/30168* (2013.01)
(58) Field of Classification Search
  CPC ..................... G06T 5/002; G06T 2207/10008; G06T 2207/30168
  See application file for complete search history.

(56) References Cited

U.S. PATENT DOCUMENTS

| 7,248,749 B2 | 7/2007 | Avinash et al. | |
| 2008/0118177 A1* | 5/2008 | Oizumi | H04N 19/60 382/275 |
| 2010/0182461 A1 | 7/2010 | On | |
| 2010/0232690 A1* | 9/2010 | Kanatsu et al. | 382/165 |
| 2012/0093433 A1* | 4/2012 | Gupta | G06T 5/007 382/260 |

OTHER PUBLICATIONS

Dimitrios Ventzas, Nikolaos Ntogas and Maria-Malamo Ventza (2012). Digital Restoration by Denoising and Binarization of Historical Manuscripts Images, Advanced Image Acquisition, Processing Techniques and Applications I, Dr. Dimitrios Ventzas (Ed.), ISBN: 978-953-51-0342-4, InTech, published online Mar. 14, 2012.*

* cited by examiner

*Primary Examiner* — Utpal Shah
*Assistant Examiner* — Pinalben Patel
(74) *Attorney, Agent, or Firm* — Christie, Parker & Hale, LLP

(57) ABSTRACT

An image processing method comprising, dividing an input image into a plurality of divided images, calculating a difference image between a divided image before noise removal and a divided image after noise removal for each of the plurality of divided images, calculating a relative value between a pixel intensity in the divided image before noise removal and a pixel intensity in the difference image for each of the plurality of divided images, detecting a frequency distribution of relative values in a background area of the input image, contained in frequency distribution of relative values calculated with respect to the plurality of divided images, and estimating an intensity of noise in accordance with the frequency distribution of the relative values in the background area.

8 Claims, 20 Drawing Sheets

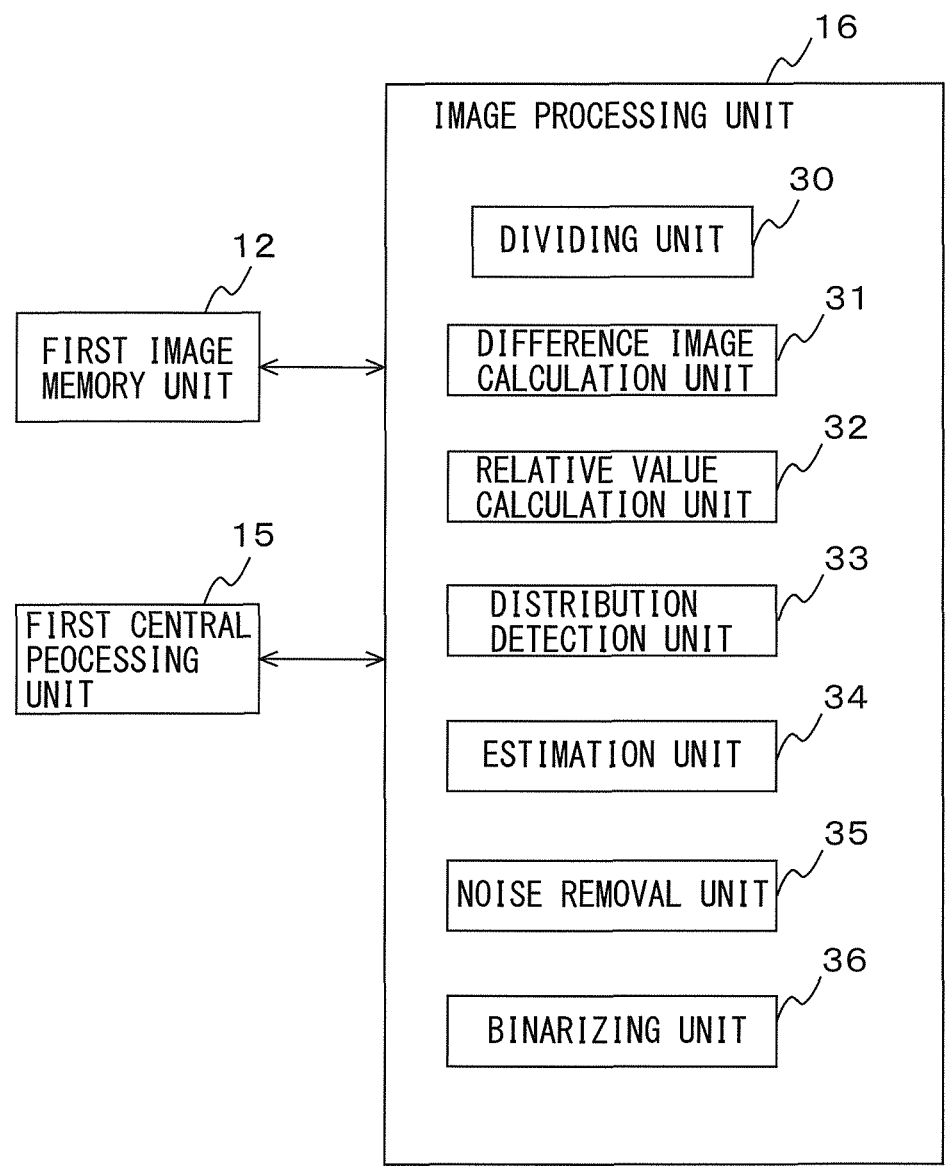

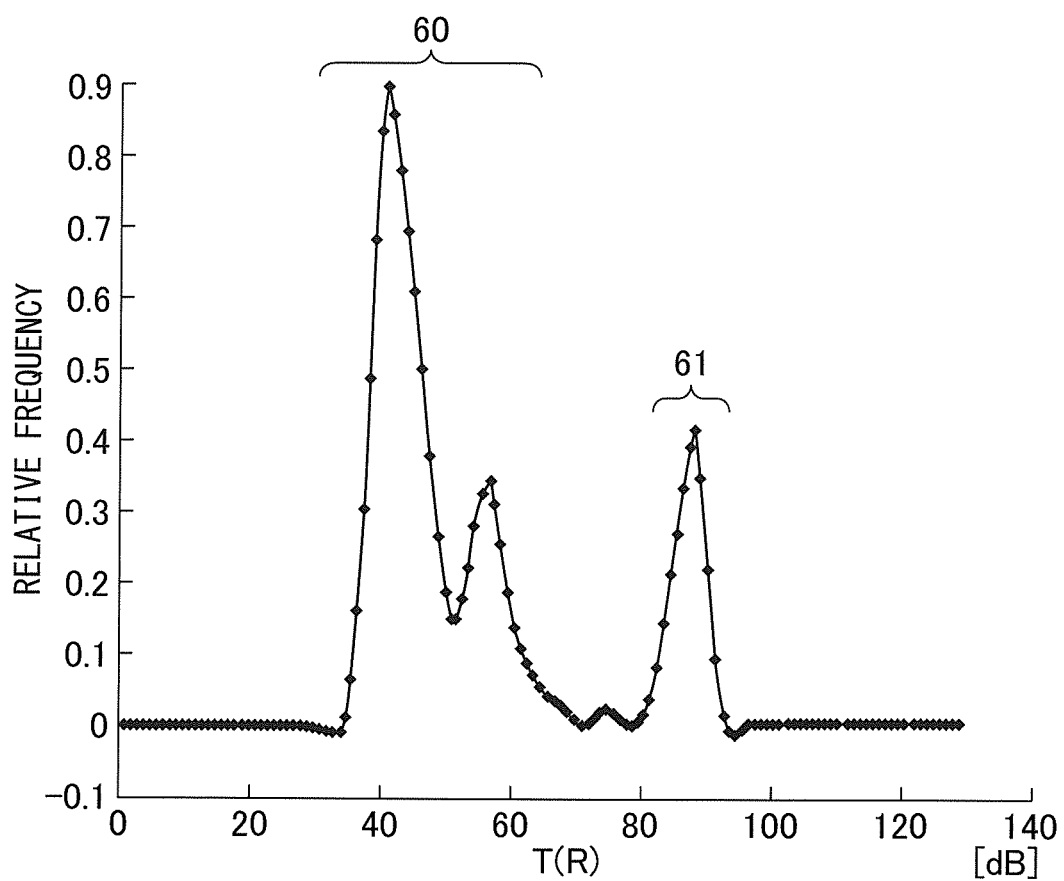

IMAGE PROCESSING APPARATUS, IMAGE PROCESSING METHOD AND COMPUTER READABLE MEDIUM

CROSS-REFERENCE TO RELATED APPLICATIONS

This application is based upon and claims the benefit of priority of prior Japanese Patent Application No. 2012-253269, filed on Nov. 19, 2012, the entire contents of which are incorporated herein by reference.

TECHNICAL FIELD

Embodiments illustrated herein relate to estimation of an intensity of noise contained in an image.

BACKGROUND

Conventionally, when character information is extracted from a document, the document is read using a scanner or the like to generate a digital image. Such a digital image generated from a document in this manner may contain noise. To remove the noise contained in the digital image, it is possible to use a noise removal filter such as a median filter, average filter, Gaussian filter, or the like.

There is known a method for S/N (Signal/Noise) ratio dependent image processing, as a related art. The image processing method includes computing at least one S/N ratio for at least one region of an image, determining a filter parameter based on the at least one S/N ratio, and processes the at least one region of the image based on the filter parameter.

As another related art, there is known an image signal processing device including an area dividing unit that divides image signals acquired by an image capturing element and subjected to predetermined image processing into a plurality of areas on the basis of color information and a noise reducing unit that performs different noise reduction processing on the individual areas of the image signals divided by the area dividing unit.

Related art is disclosed in U.S. Pat. No. 7,248,749 and U.S. patent application publication No. 2010/0182461.

SUMMARY

Extraction accuracy in extracting a character from a digital image generated from a document largely depends on noise contained in the digital image. Therefore, it is desirable to know the intensity of the noise contained in the digital image.

For example, when a filter exhibiting an excessively large noise removal effect is used compared with an intensity of noise contained in a digital image, character information in the image may also be removed. On the other hand, when a filter exhibiting an excessively small noise removal effect is used compared with an intensity of noise contained in a digital image, the noise contained in the digital image may not be adequately removed. Intensity information on noise is useful, for example, for such filter selection.

The apparatus, method and computer readable medium disclosed in the present specification are intended to estimate an intensity of noise contained in an image.

In accordance with an aspect of the embodiment, there is provided an image processing apparatus comprising, a dividing unit for dividing an input image into a plurality of divided images, a difference image calculation unit for calculating a difference image between a divided image prior to noise removal and a divided image after noise removal with respect to each of the plurality of divided images, a relative value calculation unit for calculating a relative value between a pixel intensity in the divided image prior to noise removal and a pixel intensity in the difference image with respect to each of the plurality of divided images, a distribution detection unit for detecting a frequency distribution of relative values in a background area of the input image, contained in frequency distribution of relative values calculated with respect to the plurality of divided images and an estimation unit for estimating an intensity of noise in accordance with the frequency distribution of the relative values in the background area.

In accordance with another aspect of the embodiment, there is provided an image processing method comprising, dividing an input image into a plurality of divided images, calculating a difference image between a divided image prior to noise removal and a divided image after noise removal with respect to each of the plurality of divided images, calculating a relative value between a pixel intensity in the divided image prior to noise removal and a pixel intensity in the difference image with respect to each of the plurality of divided images, detecting a frequency distribution of relative values in a background area of the input image, contained in frequency distribution of relative values calculated with respect to the plurality of divided images, and estimating an intensity of noise in accordance with the frequency distribution of the relative values in the background area.

In accordance with another aspect of the embodiment, there is provided a computer-readable, non-transitory medium storing a computer program for causing a computer to execute a process, the process comprising, dividing an input image into a plurality of divided images, calculating a difference image between a divided image prior to noise removal and a divided image after noise removal with respect to each of the plurality of divided images, calculating a relative value between a pixel intensity in the divided image prior to noise removal and a pixel intensity in the difference image with respect to each of the plurality of divided images, detecting a frequency distribution of relative values in a background area of the input image, contained in frequency distribution of relative values calculated with respect to the plurality of divided images, and estimating an intensity of noise in accordance with the frequency distribution of the relative values in the background area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating a first example of a functional configuration of an image processing unit.

FIG. 14B is a chart illustrating a sixth example of a histogram of frequency distributions of relative values.

DESCRIPTION OF EMBODIMENTS

1. First Embodiment

Embodiments of an image processing apparatus, an image processing method, and a computer program according to this application will now be described with reference to the drawings. However, it should be noted that the technical scope of this application is not limited to these embodiments but covers the invention described in the claims and its equivalents.

1.1. Hardware Configuration

Figure 1:
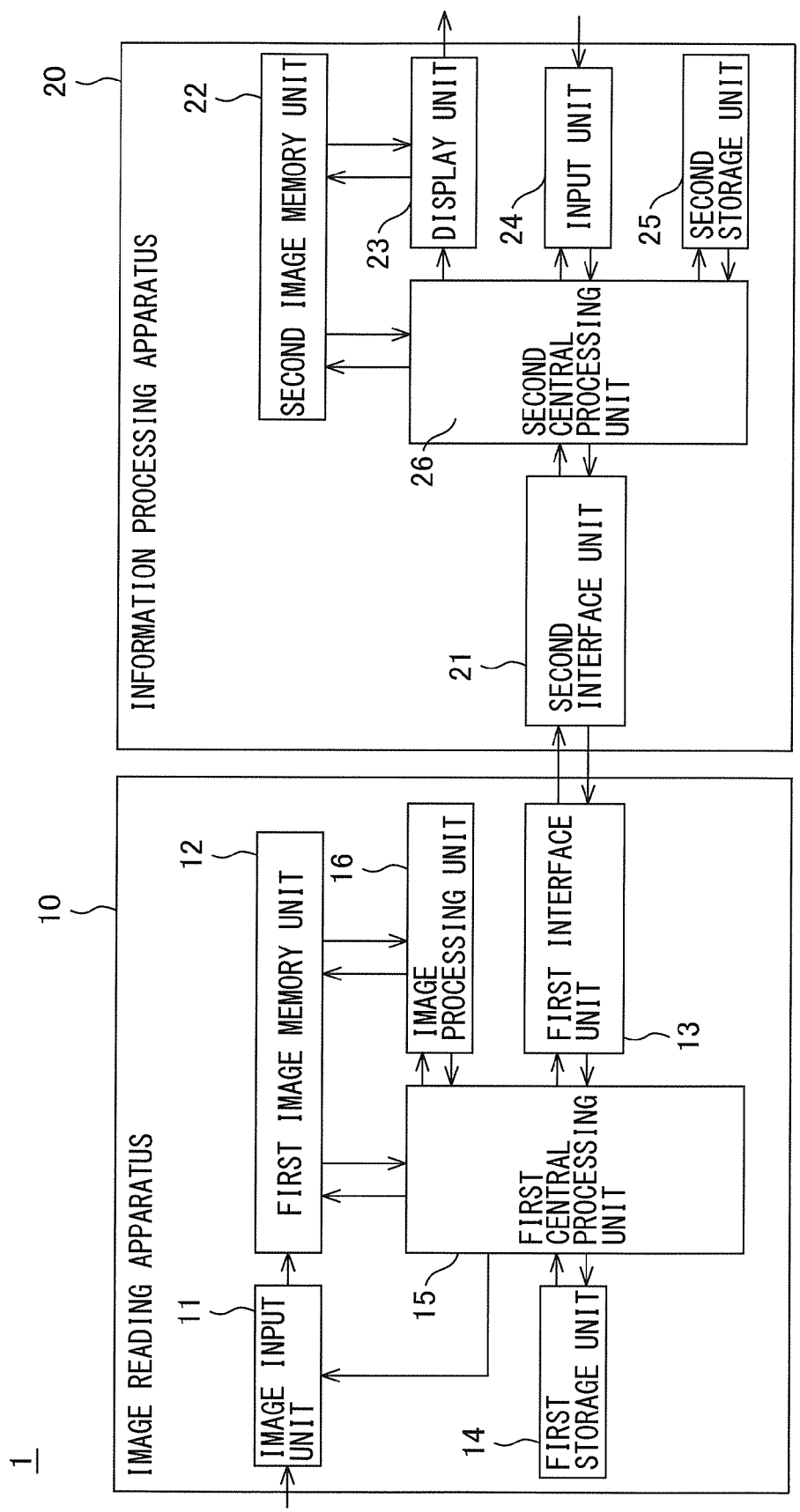
FIG. 1 is a diagram of a hardware configuration of an image processing system.

FIG. 1 is a diagram of a hardware configuration of an image processing system. An image processing system 1 includes an image reading apparatus 10 and an information processing apparatus 20. The image reading apparatus 10 is, for example, an image scanner, a digital camera, or the like. The information processing apparatus 20 is, for example, a personal computer or the like used by connecting to the image reading apparatus 10.

The image reading apparatus 10 includes an image input unit 11, a first image memory unit 12, a first interface unit 13, a first storage unit 14, a first central processing unit 15, and an image processing unit 16. Each unit of the image reading apparatus 10 will be described below in detail.

The image input unit 11 includes an image sensor for imaging a document, a landscape, a portrait, and the like as a subject to be imaged. Hereinafter, an example using a document as a subject to be imaged will be described below. The image sensor includes an imaging device such as a CCD (Charge Coupled Device), a CMOS (Complementary Metal Oxide Semiconductor), and the like arrayed one-dimensionally or two-dimensionally and an optical system for focusing an image as a subject to be imaged onto the imaging device. The imaging device outputs an analog value corresponding to each color of RGB (Red-Green-Blue) for each pixel. Signal values corresponding to red, green, and blue are expressed as an R value, a G value, and a B value, respectively, in some cases.

The image input unit 11 converts analog signals output from the imaging device to digital signals and then generates image data (hereinafter referred to as a "RGB image"). An RGB image may be color image data expressed with 8 bits each for an R value, a G value, and a B value.

Then, the image input unit 11 generates an image (hereinafter referred to as an "input image") where an R value, a G value, and a B value of each pixel of the RGB image are converted to a brightness value and a YUV value that is a color difference value to be stored in the first image memory unit 12. Herein, a Y value, a U value, and a V value constituting the YUV value can be calculated using, for example, the following expressions.

$$Y \text{ value}=0.30 \times R \text{ value}+0.59 \times G \text{ value}+0.11 \times B \text{ value} \quad (1)$$

$$U \text{ value}=-0.17 \times R \text{ value}-0.33 \times G \text{ value}+0.50 \times B \text{ value} \quad (2)$$

$$V \text{ value}=0.50 \times R \text{ value}-0.42 \times G \text{ value}-0.08 \times B \text{ value} \quad (3)$$

The first image memory unit 12 includes a storage device such as a non-volatile semiconductor memory, a volatile semiconductor memory, a magnetic disk. The first image memory unit 12 is connected to the image input unit 11 to store an input image generated by the image input unit 11. The first image memory unit 12 is connected to the image processing unit 16 to store an image generated via image processing for the input image by the image processing unit 16.

The first interface unit 13 includes an interface circuit conforming to a serial bus such as USB (Universal Serial Bus) and is electrically connected to the information processing apparatus 20 to transmit and receive image data and various types of information. Further, the first interface unit 13 may be connected to a flash memory or the like to store image data stored in the first image memory unit 12. Further, the first interface unit 13 may include a wireless interface circuit for communicating with the information processing apparatus 20 via a wireless network.

The first storage unit 14 includes a memory device such as a RAM (Random Access Memory) or a ROM (Read Only Memory), a fixed disk drive such as a hard disk drive, or a portable storage device such as a flexible disk or an optical disk. Further, the first storage unit 14 stores a computer program, a data base, a table, and the like used for various types of processing of the image reading apparatus 10.

The first central processing unit 15 is connected to the image input unit 11, the first image memory unit 12, the first interface unit 13, the first storage unit 14, and the image processing unit 16 to control each of these units. The first central processing unit 15 performs an input image generation control of the image input unit 11, a control of the first image memory unit 12, a control of transmission of data to and reception thereof from the information processing apparatus 20 via the first interface unit 13, a control of the first storage unit 14, a control of image processing by the image processing unit 16, and the like.

The image processing unit 16 is connected to the first image memory unit 12 to execute processing for estimating an intensity of noise contained in the input image, processing for removing noise contained in the input image, and binarizing processing for binarizing an input image after noise removal. The image processing unit 16 is connected to the first central processing unit 15 to operate based on a program previously stored in the first storage unit 14 by a control from the first central processing unit 15. Herein, the image processing unit 16 may be configured using an integrated circuit, a microprocessor, a firmware, and the like that are independent of each other.

The information processing apparatus 20 includes a second interface unit 21, a second image memory unit 22, a display unit 23, an input unit 24, a second storage unit 25, and a second central processing unit 26. Each unit of the information processing apparatus 20 will be described below in detail.

The second interface unit 21 includes an interface circuit with the same function as the interface circuit in the first interface unit 13 of the image reading apparatus 10, and connects the information processing apparatus 20 with the image reading apparatus 10.

The second image memory unit 22 includes a storage device with the same function as the storage device in the first image memory unit 12 of the image reading apparatus 10. The second image memory unit 22 stores image data received from the image reading apparatus 10 via the second interface unit 21.

The display unit 23 includes display device such as a liquid crystal display, or an OELD (organic electroluminescence display) and an interface circuit for outputting image data to the display device. The display unit 23 is connected to the second image memory unit 22 to display image data stored in the second image memory unit 22 on the display device.

The input unit 24 includes an interface circuit for acquiring signals from input device such as a keyboard, or a mouse or another input device, and outputs signals in response to an operation of the user to the second central processing unit 26.

The second storage unit 25 includes a storage device, such as the memory device, the fixed disk drive, or the portable storage device, with the same function as the storage device in the first storage unit 14 of the image reading apparatus 10. The second storage unit 25 stores a computer program, a database, a table, and the like used for various types of processing of the information processing apparatus 20.

The second central processing unit 26 is connected to the second interface unit 21, the second image memory unit 22, the display unit 23, the input unit 24, and the second storage unit 25 to control each of these units. The second central processing unit 26 performs a control of transmission of data to and reception thereof from the image reading apparatus 10 via the second interface unit 21, a control of the second image memory unit 22, a display control of the display unit 23, an input control of the input unit 24, a control of the second storage unit 25, and the like.

Herein, the hardware configuration illustrated in FIG. 1 is merely an example for illustrating the embodiments. As long as the following operations are executed, the image processing system 1 described in this specification may employ any other hardware configuration.

1.2. Functional Configuration

FIG. 2 is a diagram illustrating a first example of a functional configuration of the image processing unit 16. The image processing unit 16 includes a dividing unit 30, a difference image calculation unit 31, a relative value calculation unit 32, a distribution detection unit 33, an estimation unit 34, a noise removal unit 35, and a binarizing unit 36. Herein, the functional configuration view of FIG. 2 mainly illustrates a configuration relevant to functions to be described in this specification concerning the image processing unit 16. The image processing unit 16 may include other constituent elements in addition to those illustrated. This is the same as for the functional configuration view of FIG. 16.

Figure 3A:
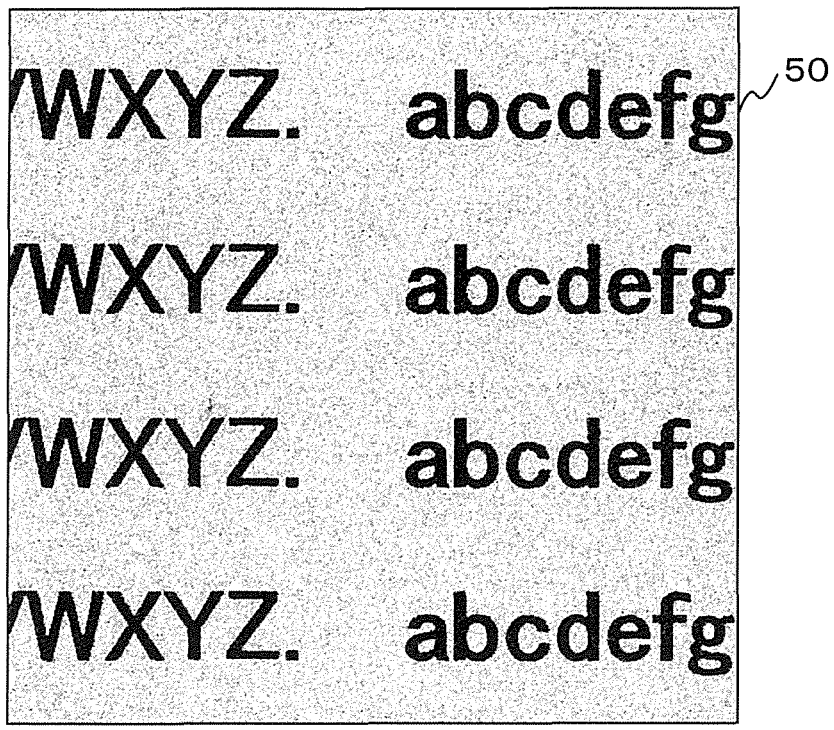
FIG. 3A is a view illustrating an example of an input image.

The dividing unit 30 reads an input image stored in the first image memory unit 12 and divides the input image into a plurality of divided images. FIG. 3A is a view illustrating an example of the input image. An input image 50 illustrated as an example contains characters and the characters are formed with pixels each of which has a pixel intensity lower than the pixel intensities in a background area. In other words, the characters have a brightness darker than the background area and a color density deeper than the background area. Such an input image is acquired when, for example, a document having black characters printed on a white background is imaged using the image input unit 11.

Figure 3B:
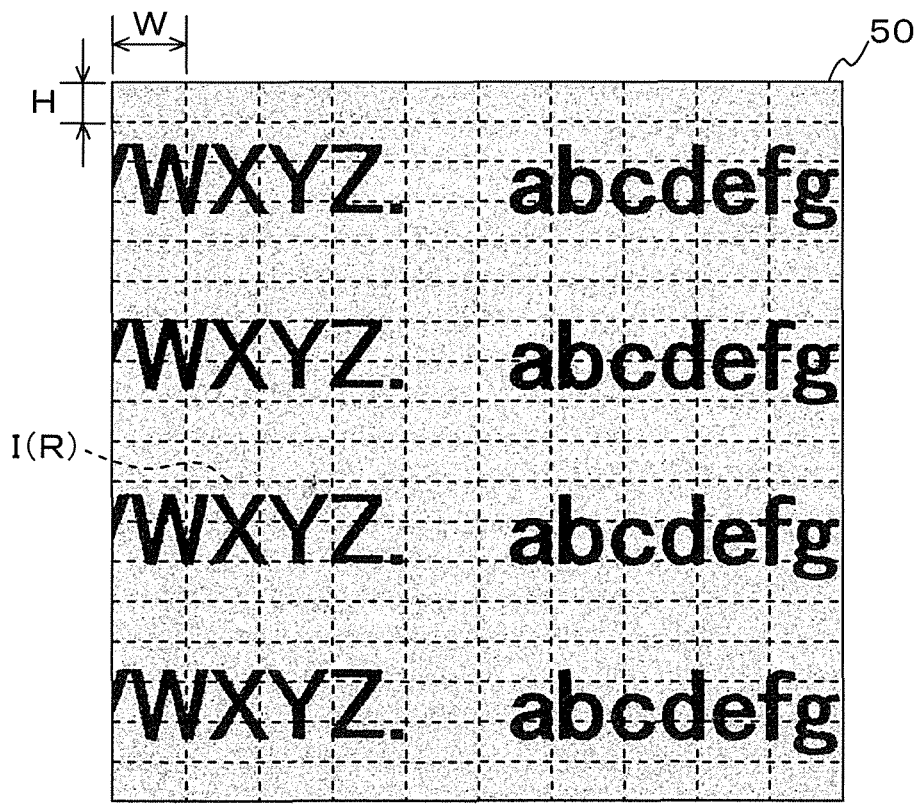
FIG. 3B is a view illustrating dividing of an input image.

FIG. 3B is a view illustrating dividing of the input image 50 by the dividing unit 30. The dashed lines of FIG. 3B indicate dividing lines. The number of pixels in a width direction of one divided image is designated as W and the number of pixels in a height direction is designated as H. The reference sign I(R) is a reference sign for referring to each divided image divided from the input image 50, and the sign R represents a variable for uniquely designating an area where the divided image is taken out.

Figure 4A:
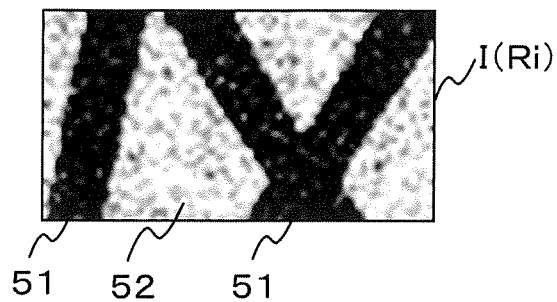
FIG. 4A is a view illustrating an example of a divided image.
Figure 4B:
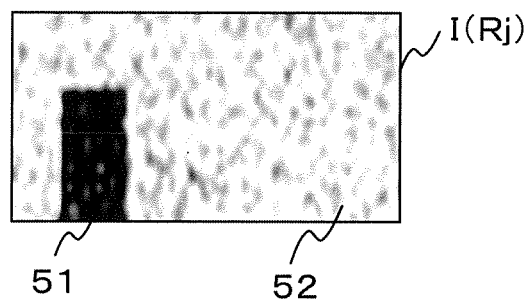
FIG. 4B is a view illustrating an example of a divide image.
Figure 4C:
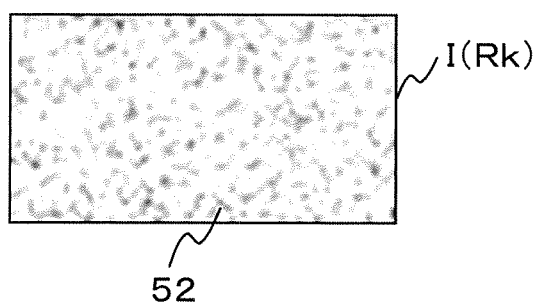
FIG. 4C is a view illustrating an example of a divide image.

FIG. 4A to FIG. 4C are views illustrating examples of the divided images I(R). Divided images I(Ri), I(Rj), and I(Rk) are images taken out from different areas Ri, Rj, and Rk in the input image 50, respectively. The divided images I(Ri), I(Rj), and I(Rk) are classified into an image containing character pixels and an image containing only background area pixels, depending on areas taken out from an original input image 50.

For example, the divided images I(Ri) and I(Rj) contain both character pixels 51 and background area pixels 52, while the divided image I(Rk) contains only background area pixels 52. Further, even in the divided images I(Ri) and I(Rj) containing the character pixels 51, the proportion of character pixels is different depending on a position taken out from the input image 50. For example, the divided image I(Ri) is occupied by the character pixels 51 more than the divided image I(Rj).

Refer to FIG. 2. The difference image calculation unit 31 generates a divided image IF(R) after noise removal corresponding to an image in which noise is removed from the divided image I(R) by predetermined noise removal processing. For example, the difference image calculation unit 31 may generate the divided image IF(R) after noise removal by executing the noise removal processing for each divided image I(R). In another embodiment, the input image 50 after undergoing the noise removal processing may be divided in the same manner as in dividing of the divided image I(R) to generate the divided image IF(R) after noise removal.

Figure 5:
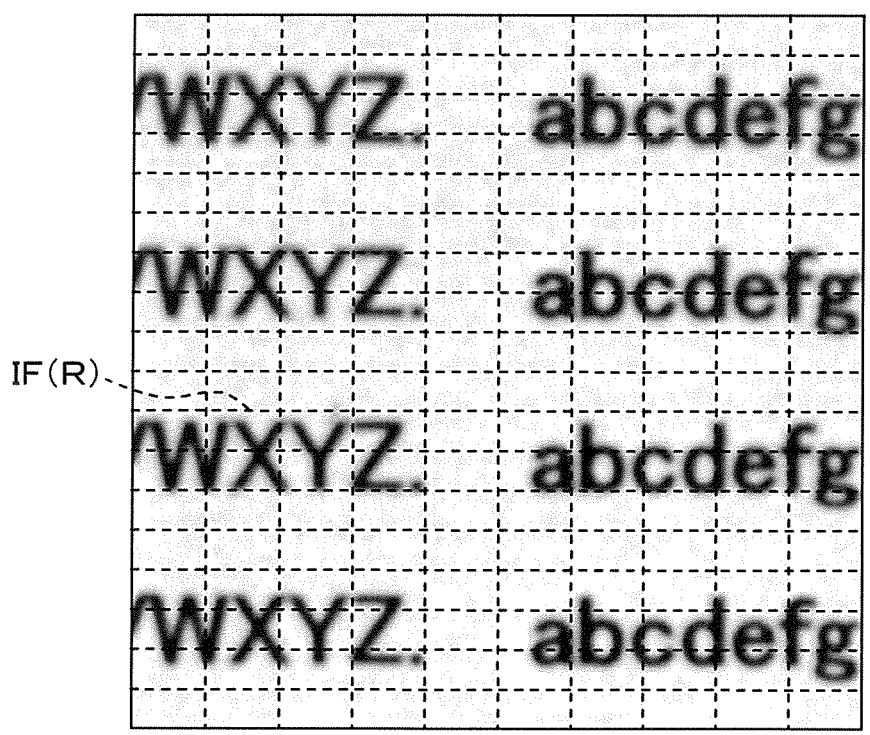
FIG. 5 is a view illustrating an example of a divided image after noise removal.

The predetermined noise removal processing may have effectiveness by which an effect that the noise having a predetermined intensity is completely removed can be expected. For example, the predetermined noise removal processing may be processing producing an effect that is relatively strong to the extent that a part of character information lacks from an image after noise removal, as long as the predetermined noise removal processing is possible to completely remove noise having a predetermined intensity contained in a background area. The predetermined noise removal processing may be filtered using, for example, a noise removal filter. FIG. 5 is a view illustrating an example of the divided image IF(R) after noise removal.

The difference image calculation unit 31 calculates a difference image IN(R) between the divided image I(R) prior to noise removal and the divided image IF(R) after noise removal with respect to each divided image I(R) (i.e., each area R).

The relative value calculation unit 32 calculates a relative value T(R) between a pixel intensity in the divided image I(R) prior to noise removal and a pixel intensity in the difference image IN(R) with respect to each divided image I(R). The pixel intensity in the divided image I(R) is derived from all or a part of pixels contained in the divided image I(R), and the pixel intensity refers to a representative value representing pixel intensities of all of the pixels contained in the divided image I(R). In the same manner, the pixel intensity in the difference image IN(R) is derived from all or a part of pixels contained in the difference image IN(R), and the pixel intensity refers to a representative value representing pixel intensities of all of the pixels contained in the difference image IN(R).

For example, the pixel intensity of the divided image I(R) may be a power spectrum P1 of pixel intensities of pixels contained in the divided image I(R) calculated by the following expression (4). I(R, m, n) is a pixel intensity of a pixel having coordinates (m, n) in the divided image I(R). The power spectrum of pixel intensities of pixels contained in an image refers to a sum of square values of pixels contained in the image.

$$P1 = \sum_{m=1}^{H} \sum_{n=1}^{W} I(R, m, n)^2 \quad (4)$$

For example, a pixel intensity of the difference image IN(R) may be a power spectrum P2 of pixel intensities of pixels contained in the difference image IN(R) calculated by the following expression (5). IF(R, m, n) is a pixel intensity of a pixel having coordinates (m, n) in a divided image IF(R) after noise removal.

$$P2 = \sum_{m=1}^{H} \sum_{n=1}^{W} (I(R, m, n) - IF(R, m, n))^2 \quad (5)$$

The above power spectra are examples of the pixel intensity of the divided image I(R) and the pixel intensity of the difference image IN(R). Any other calculation expression for calculating the pixel intensity of the divided image I(R) and the pixel intensity of the difference image IN(R) is employable. For example, the pixel intensity of the divided image I(R) and the pixel intensity of the difference image IN(R) may be a sum of absolute values of pixels in the divided image I(R) and a sum of absolute values of pixels in the difference image IN(R), respectively.

The relative value calculation unit 32 calculates a relative value T(R) based on a ratio of a pixel intensity of the divided image I(R) prior to noise removal to a pixel intensity of the difference image IN(R). For example, the relative value calculation unit 32 calculates a relative value T(R) calculated by the following expression (6). The relative value T(R) of expression (6) is an decibel expression of a ratio of the pixel intensity of the divided image I(R) prior to noise removal to the pixel intensity of the difference image IN(R).

$$T(R) = \log \frac{\sum_{m=1}^{H} \sum_{n=1}^{W} I(R, m, n)^2}{\sum_{m=1}^{H} \sum_{n=1}^{W} (I(R, m, n) - IF(R, m, n))^2} [dB] \quad (6)$$

The relative value T(R) may be calculated by any other calculation expression. For example, the relative value calculation unit 32 may calculate, as a relative value T(R), a ratio itself of a pixel intensity of the divided image I(R) prior to noise removal to a pixel intensity of the difference image IN(R).

The difference image IN(R) is an image obtained by subtracting the divided image IF(R) after noise removal from the divided image I(R) prior to noise removal and therefore a pixel intensity of the difference image IN(R) is expected to indicate an intensity of a noise component contained in the divided image I(R). Therefore, the relative value T(R) of the divided image I(R) and the difference image IN(R) approximates a signal noise ratio (SNR) in the divided image I(R).

Figure 6:
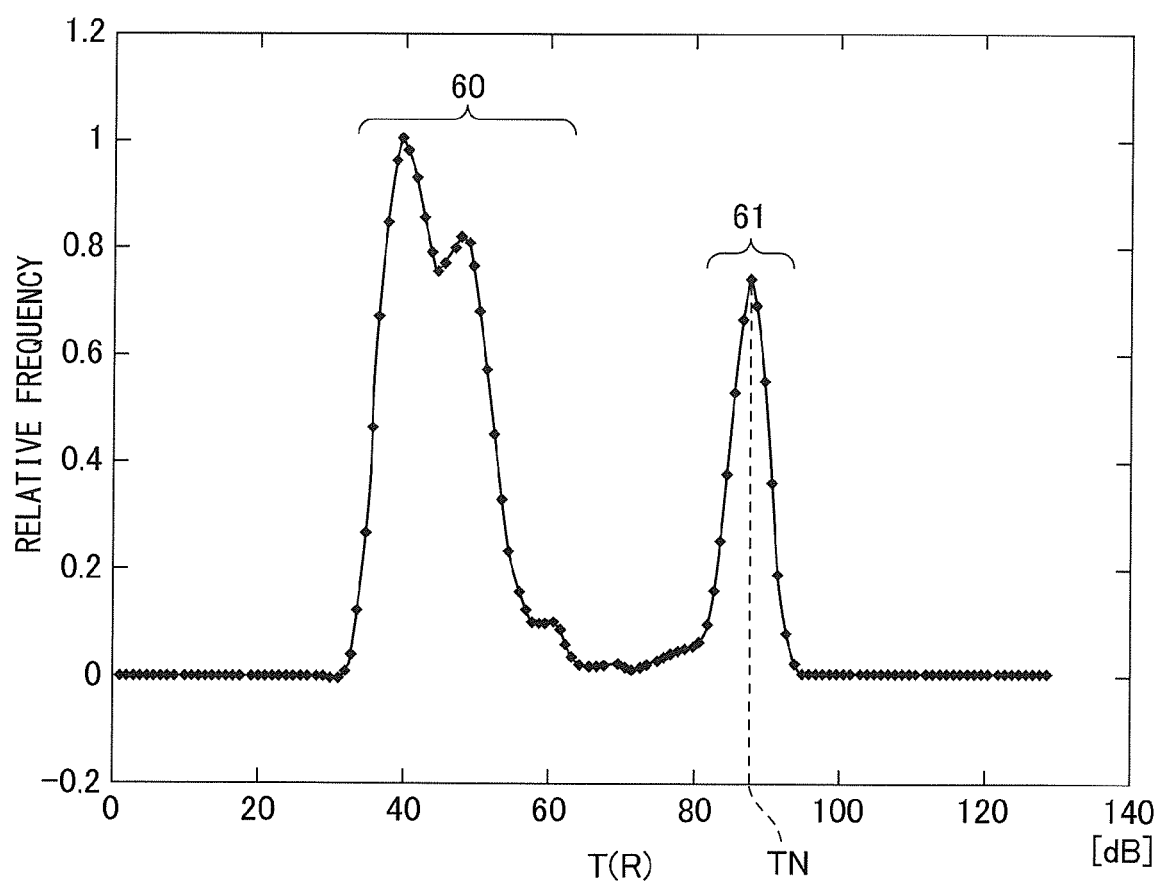
FIG. 6 is a chart illustrating a first example of a histogram of frequency distributions of relative values.

The distribution detection unit 33 generates a histogram of frequency distributions of relative values T(R) calculated with respect to each of a plurality of divided images I(R). FIG. 6 is a chart illustrating a first example of a histogram of frequency distributions of relative values T(R).

In the case of an input image containing characters in a background area, the frequency distributions are expected to generate a plurality of groups. As described above, a pixel intensity of a character pixel is lower than a pixel intensity of a background area pixel. Therefore, pixel intensities of the divided images I(Ri) and I(Rj) containing character pixels as illustrated in FIG. 4A and FIG. 4B, respectively, are lower than a pixel intensity of the divided image I(Rk) containing only background area pixels as illustrated in FIG. 4C. As a result, relative values T(Ri) and T(Rj) calculated for the divided images I(Ri) and I(Rj), relatively, are smaller than a relative value T(Rk) calculated for the divided image I(Rk).

Therefore, a frequency distribution of the relative values T(R) is separated into a frequency distribution 60 of relative values calculated for divided images containing character pixels and a frequency distribution 61 of relative values calculated for divided images containing only background area pixels. In the example of FIG. 6, frequencies of relative values in the case of containing character pixels distribute in the range 60 having smaller relative values, when compared with frequencies of relative values in the case of containing only background area pixels.

The distribution detection unit 33 detects a frequency distribution of relative values T(R) in the background area contained in a frequency distribution of relative values T(R) calculated with respect to a plurality of divided images I(R). For example, the distribution detection unit 33 detects the distribution 61 present in a range of larger relative values out of the distributions 60 and 61 as a frequency distribution of relative values T(R) in the background area. A method for detecting the frequency distribution 61 will be illustrated in more detail with an example in "2. Detection Processing of Frequency Distribution of Relative Values in Background Area" is described later.

Note that, there is a case that a character is formed with pixels having a pixel intensity higher than in the background area, for example, an input image is acquired from an original document where a white character is printed on a black background. In this case, frequencies of relative values in the case of containing character pixels distribute in a range of larger relative values, compared with frequencies of relative values in the case of containing only background area pixels. The distribution detection unit 33 may detect a distribution present in a range of smaller relative values out of a plurality of distributions of relative values present in different ranges in relative value, as a frequency distribution of the relative values T(R) in the background area.

The estimation unit 34 estimates an intensity of noise contained in the input image in accordance with the frequency distribution 61 of the relative values T(R) in the background area. For example, the estimation unit 34 estimates the intensity of noise based on a relative value TN where its frequency is local maximal value in the frequency distribution 61. In another embodiment, the estimation unit 34 estimates the intensity of noise based on a relative value where its frequency has a largest value in the frequency distribution 61. Further, in another embodiment, the estimation unit 34 estimates the intensity of noise based on a relative value at the center of a distribution range of the frequency distribution 61.

The noise removal unit 35 selects a noise removal filter in accordance with the intensity of noise estimated by the estimation unit 34. For example, the noise removal unit 35 may select the noise removal filter in accordance with a relative value TN. With the larger intensity of noise, the smaller the relative value TN becomes. Therefore, the smaller the relative value TN becomes, the noise removal unit 35 selects the noise removal filter exhibiting a larger noise removal effect. For example, the smaller the relative value TN becomes, the noise removal unit 35 selects a filter exhibiting a larger effect from filters each of which have different effects, such as 3×3 average filters, 3×3 median filters, 5×5 average filters, 5×5 median filters.

For example, the noise removal unit 35 adjusts a parameter of an applied filter such as a Gaussian filter so that the smaller the relative value TN becomes, noise removal effect increases. The noise removal unit 35 removes noise of the input image using a selected noise removal filter.

The binarizing unit 36 binarizes the input image where noise is removed by the noise removal unit 35. Then, the binarizing unit 36 stores a binarized image of the input image in the first image memory unit 12. The first central processing unit 15 transmits the input image and the binarized image stored in the first image memory unit 12 to the information processing apparatus 20 via the first interface unit 13.

Note that, the above-mentioned operations of the dividing unit 30, the difference image calculation unit 31, and the relative value calculation unit 32 are performed by cooperation of the first central processing unit 15 and respective constituent elements of the image reading apparatus 10 based on a program stored in the first storage unit 14. The above-mentioned operations of the distribution detection unit 33, the estimation unit 34, the noise removal unit 35, and the binarizing unit 36 are performed by cooperation of the first central processing unit 15 and respective constituent elements of the image reading apparatus 10 based on a program stored in the first storage unit 14.

1.3. Operation Description

Figure 7:
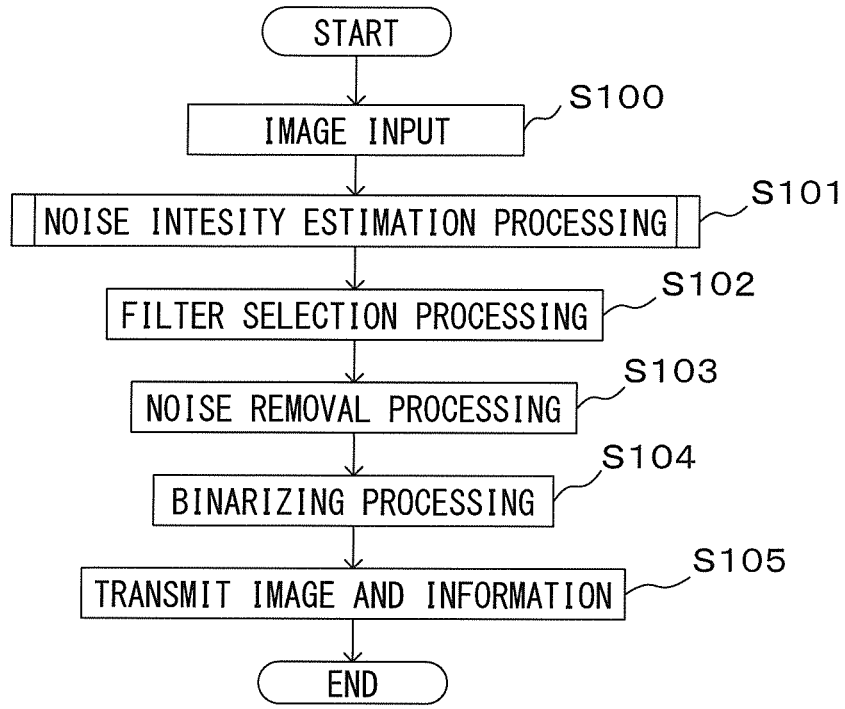
FIG. 7 is a flowchart illustrating an example of an operation of an image reading apparatus.

FIG. 7 is a flowchart illustrating an example of an operation of the image reading apparatus 10. In step S100, the image input unit 11 generates an input image where a subject to be imaged (an original document) is imaged and stores in the first image memory unit 12.

In step S101, the image processing unit 16 executes noise intensity estimation processing to estimate an intensity of noise contained in the input image. In step S102, the noise removal unit 35 selects the noise removal filter in accordance with the estimated intensity of noise. In step S103, the noise removal unit 35 removes noise of the input image using a selected noise removal filter.

In step S104, the binarizing unit 36 binarizes the input image where the noise has been removed by the noise removal unit 35. In step S105, the first central processing unit 15 transmits the input image and the binarized image to the information processing apparatus 20. Thereafter, the operation is terminated.

Figure 8:
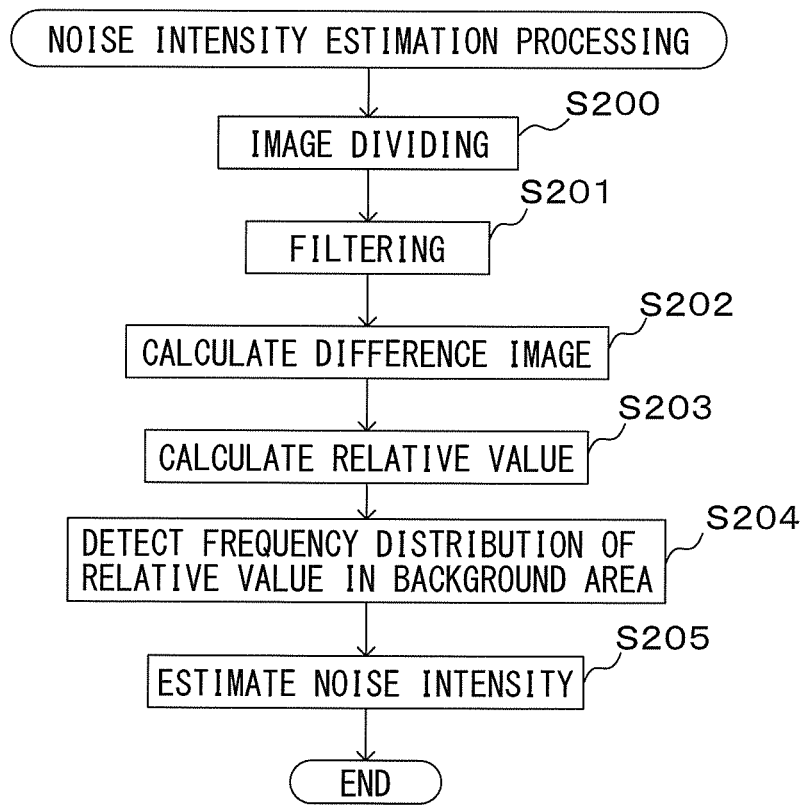
FIG. 8 is a flowchart illustrating a first example of noise intensity estimation processing.

FIG. 8 is a flowchart illustrating an example of the noise intensity estimation processing executed in step S101 of FIG. 7. In step S200, the dividing unit 30 divides the input image into a plurality of divided images I(R). In step S201, the difference image calculation unit 31 filters the divided images I(R) using the noise removal filter to generate divided images IF(R) after noise removal.

In step S202, the difference image calculation unit 31 calculates each difference image IN(R) between each of the divided images I(R) prior to noise removal and each of the divided images IF(R) after noise removal. In step S203, the relative value calculation unit 32 calculates each relative value T(R) between a pixel intensity in each of the divided images I(R) prior to noise removal and a pixel intensity in each of the difference images IN(R).

In step S204, the distribution detection unit 33 generates a histogram of frequency distributions of relative values T(R) calculated with respect to a plurality of divided images I(R). The distribution detection unit 33 detects a frequency distribution 61 of relative values T(R) in a background area from a frequency distribution of relative values T(R) calculated for a plurality of divided images I(R) based on the histogram.

In step S205, in accordance with the frequency distribution 61 of relative values T(R) in the background area, an intensity of noise is estimated. Thereafter, the noise intensity estimation processing is terminated.

1.4. Effects of the Embodiment

In the case of performing the noise removal processing at a uniform intensity prior to binarizing processing, when a noise removal effect is excessively strong, information in an image may also be removed, and when the noise removal effect is excessively weak, noise may not be adequately removed. Therefore, in the conventional binarizing processing, the noise removal processing has not been executed prior to binarizing processing.

Figure 9A:
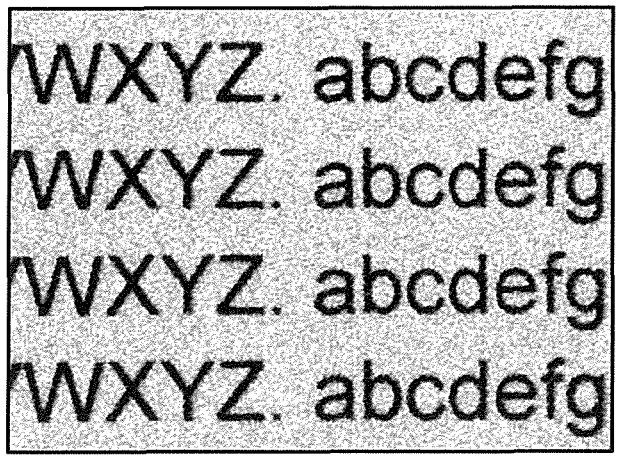
FIG. 9A is a view illustrating an example of input image containing relatively weak noise.
Figure 9B:
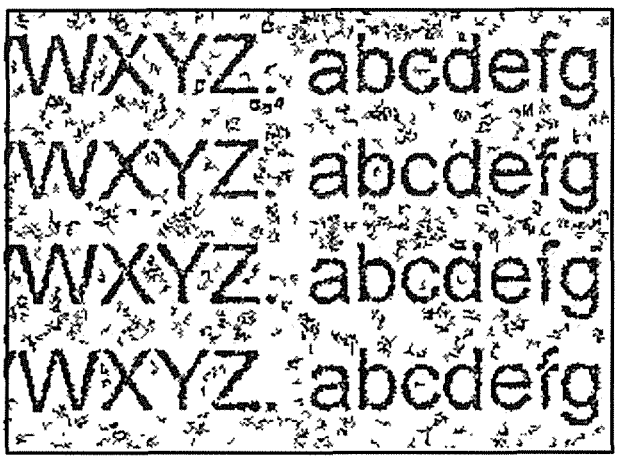
FIG. 9B is a view illustrating an example of a binarized image of the image depicted in FIG. 9A.
Figure 10A:
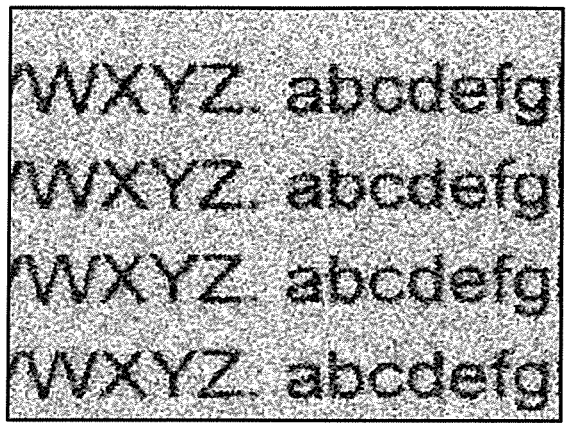
FIG. 10A is a view illustrating an example of an input image containing relatively strong noise.
Figure 10B:
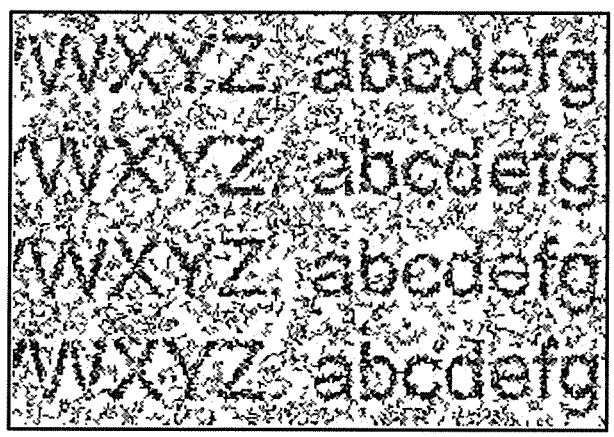
FIG. 10B is a view illustrating an example of a binarized image of the image depicted in FIG. 10A.

FIG. 9A and FIG. 9B are views illustrating examples of an input image containing relatively weak noise and a binarized image thereof, respectively. FIG. 10A and FIG. 10B are views illustrating examples of an input image containing relatively strong noise and a binarized image thereof, respectively. Since binarizing processing has been executed without the noise removal processing, the binarized images of FIG. 9B and FIG. 10B contain a large amount of noise.

Figure 9C:
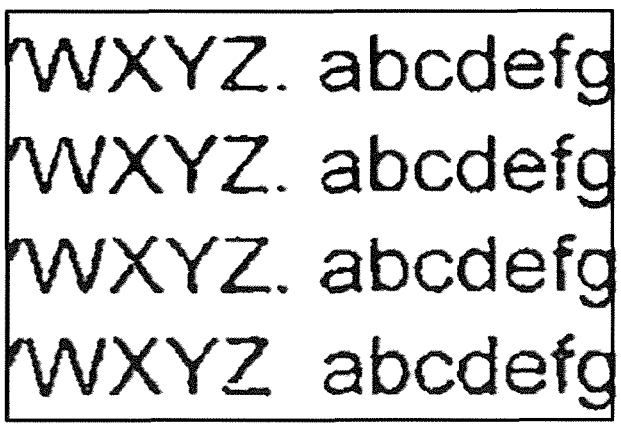
FIG. 9C is a view illustrating an example of an image binarized after noise removal.
Figure 10C:
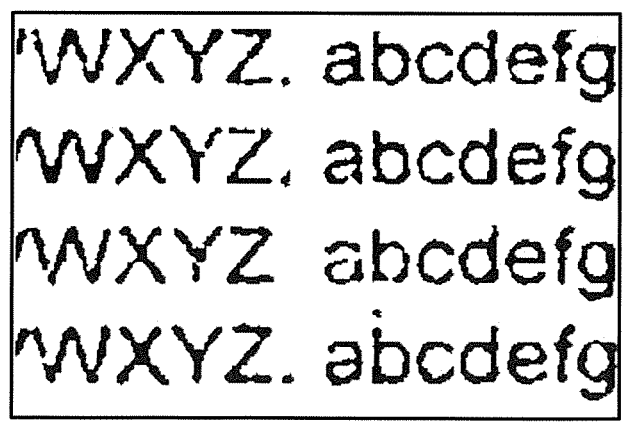
FIG. 10C is a view illustrating an example of an image binarized after noise removal.

This embodiment makes it possible to estimate an intensity of noise contained in an input image. Therefore, by changing a strength of the noise removal processing in accordance with an intensity of noise, the noise removal processing can be executed prior to binarizing processing. FIG. 9C is a view illustrating an example of an image binarized after the noise removal processing of the input image of FIG. 9A by employing this embodiment. FIG. 10C is a view illustrating an example of an image binarized after the noise removal processing of the input image of FIG. 10A by employing this embodiment. The binarized images of FIG. 9C and FIG. 10C are found to contain little noise in the background area and little removal of the character information.

In addition, this embodiment makes it possible to extract a relative value T(R) of an area containing only background area pixels from the relative values T(R) each approximating an signal noise ratio of each divided image I(R). The area containing only background area pixels contains no character information that is a signal component. Therefore, this embodiment makes it possible to estimate a noise intensity itself of an input image from the relative values T(R) of an area containing only background area pixels.

Figure 11A:
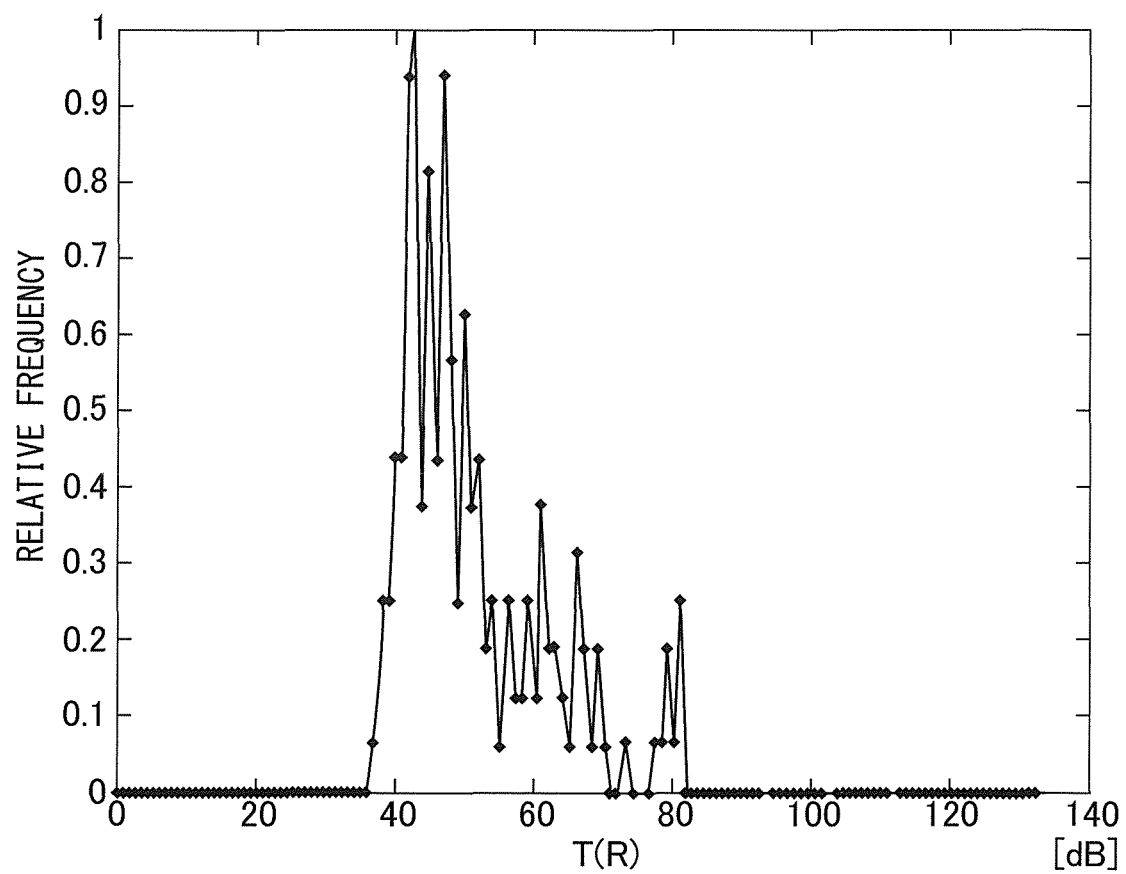
FIG. 11A is a chart illustrating a second example of a histogram of frequency distributions of relative values.

2. Detection Processing of Frequency Distribution of Relative Values in Background Area FIG. 11A is a chart illustrating a second example of a histogram of frequency distributions of the relative values T(R). Hereinafter, a case where pixels having a pixel intensity lower than in a background area form a character will be described below. A case where pixels having a pixel intensity larger than in the background area form a character is also treated in the same manner except that their magnitude relations of the relative values are opposite.

In some histograms of frequency distributions of the relative values T(R), frequencies with changes in the relative values T(R) minutely vary. In cases of such frequency distributions, it is difficult to determine in which range frequencies of relative values of an area containing character pixels distribute and in which range frequencies of relative values of an area containing only background area pixels distribute. Further, since a large number of local maximum values are generated in a frequency distribution of relative values of an area containing only background area pixels, it is difficult to select a relative value used for a standard of noise estimation.

Figure 11B:
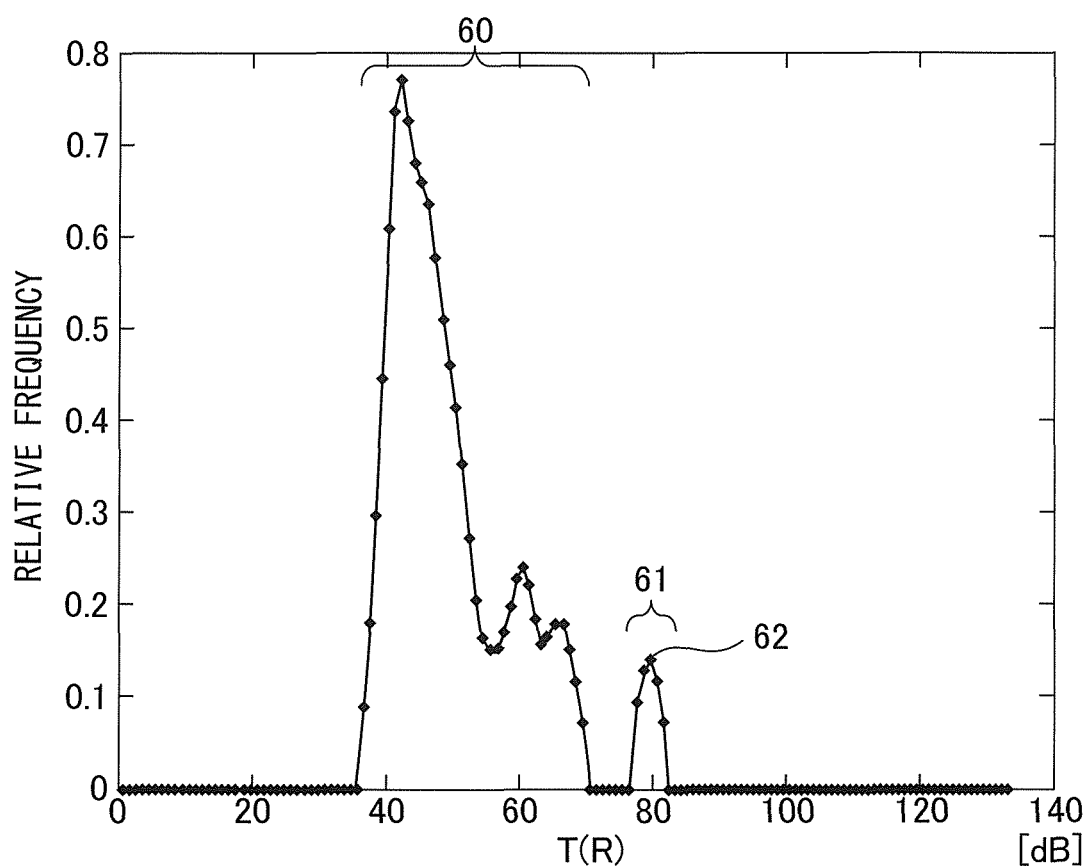
FIG. 11B is a chart illustrating a histogram after filtering using a lowpass filter.

Therefore, the estimation unit 34 removes minute variations of frequencies contained in the histogram of frequency distributions of the relative values T(R) using a lowpass filter. FIG. 11B is a chart illustrating a histogram after filtering using the lowpass filter. Having minute variations of frequencies been removed, a distribution 60 of frequencies of relative values of an area containing character pixels and a distribution 61 of frequencies of relative values of an area containing only background area pixels are clearly separated. Further, in the distribution 61 of frequencies of relative values of an area containing only background area pixels, a relative value having the highest frequency is easily detected as a local maximum point 62.

Note that, filtering the histogram of frequency distributions using the lowpass filter moves the local maximum point. The estimation unit 34 may execute both filtering for inputting frequency data into the lowpass filter in a forward direction and filtering for inputting frequency data thereinto in a backward direction to offset the movement of the local maximum point.

Figure 12:
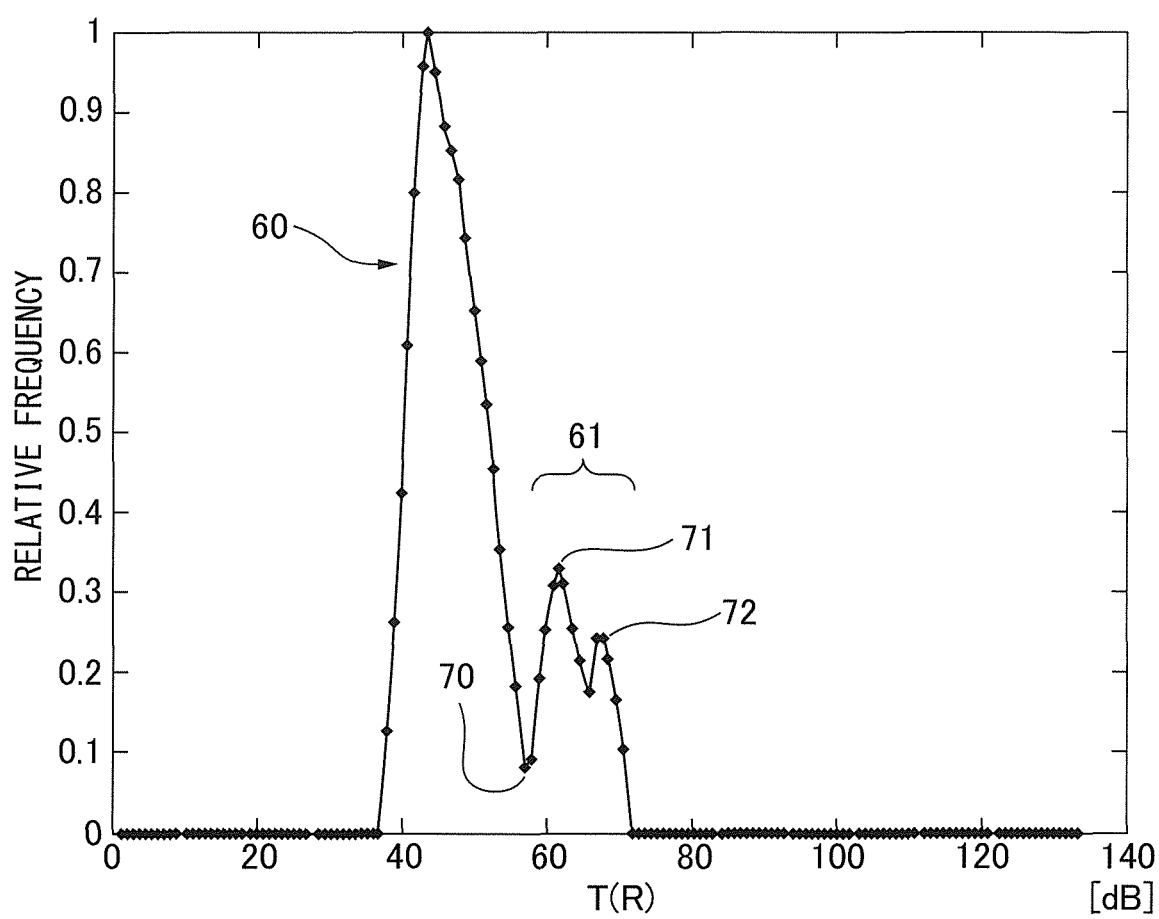
FIG. 12 is a chart illustrating a third example of a histogram of frequency distributions of relative values.

FIG. 12 is a chart illustrating a third example of a histogram of frequency distributions of relative values. When the distribution 60 of frequencies of relative values of an area containing character pixels and the distribution 61 of frequencies of relative values of an area containing only background area pixels are separated, a local minimum point 70 is generated between the distribution 60 and the distribution 61, and the frequency at the minimum point 70 is the lowest among the frequencies at the other local minimum points.

The estimation unit 34 may detect the local minimum point 70 having a smallest local minimum value and determine that the distribution 61 of frequencies of relative values of an area containing only background area pixels is present in a range of relative values larger than the local minimum point 70. The estimation unit 34 may determine that the distribution 60 of frequencies of relative values of an area containing character pixels is present in a range of relative values smaller than the local minimum point 70.

The estimation unit 34 may estimate an intensity of noise contained in the input image based on a relative value T(R) of either the local maximum point 71 or 72 in a range of relative values larger than the local minimum point 70. For example, the estimation unit 34 may estimate the intensity of noise based on the local maximum point 71 that is a smaller relative value out of a plurality of the local maximum points 71 and 72 in a range of relative values larger than the local maximum point 70. When the intensity of noise is estimated based on the local maximum point 71 of a smaller relative value, a larger intensity of noise is estimated and thereby a filter exhibiting a higher effect can be selected.

Figure 13:
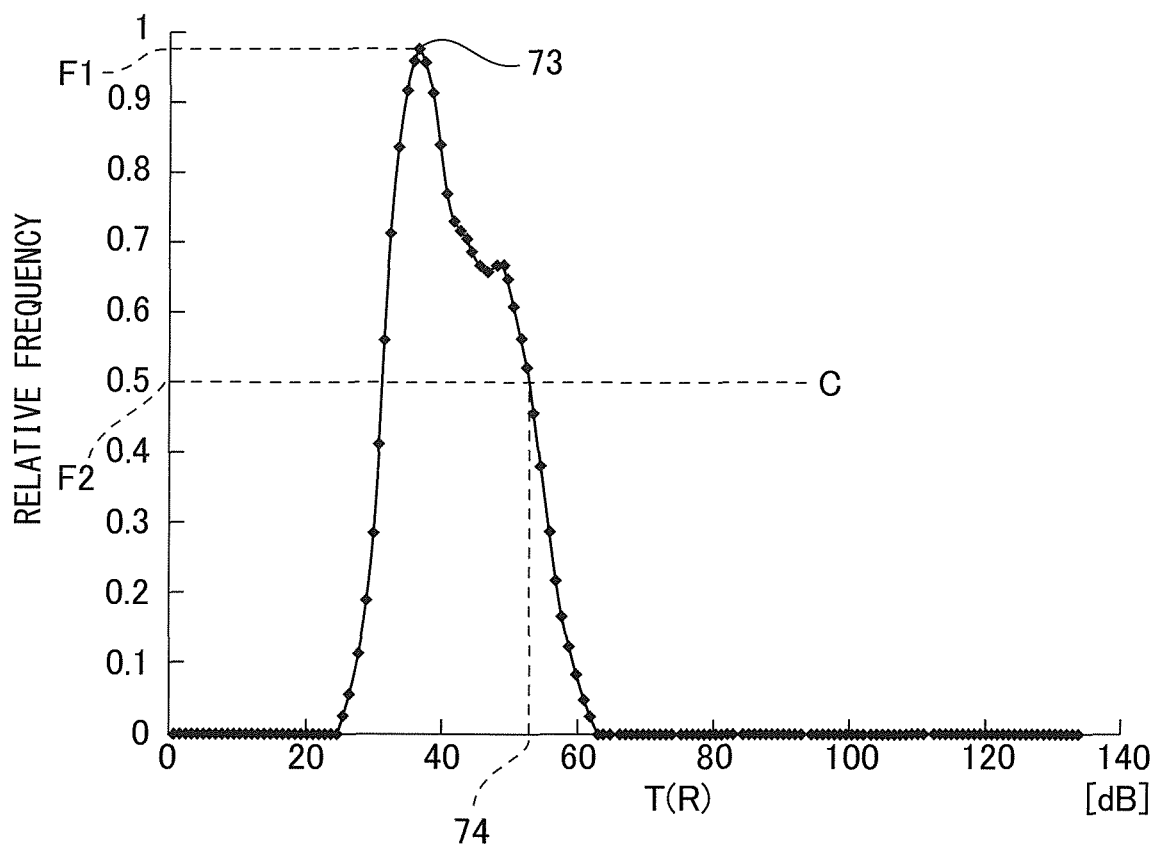
FIG. 13 is a chart illustrating a fourth example of a histogram of frequency distributions of relative values.

FIG. 13 is a chart illustrating a fourth example of a histogram of frequency distributions of relative values. There is a case that the distribution 60 of frequencies of relative values in an area containing character pixels and the distribution 61 of frequencies of relative values in an area containing only background area pixels may not be clearly separated. For example, when a boundary between the character and the background area is not clear, such a histogram may be generated. In this case, there is a possibility that a local maximum point 73 may be a local maximum point of frequency distributions of relative values in an area containing character pixels. A relative value of the area containing character pixels is smaller than a relative value of the area containing only background area pixels. Therefore, when the intensity of noise is estimated based on the local maximum point 73, an excessively large intensity of noise is estimated, and accordingly, there is a possibility that an excessively strong filter may be selected.

Therefore, the estimation unit 34 determines a frequency F2 where a local maximum value F at the local maximum point 73 is multiplied by a predetermined coefficient C of less than 1 and then estimates the intensity of noise based on a relative value 74 larger than the local maximum point 73 out of the relative values T(R) corresponding to a frequency F2. When the intensity of noise is estimated based on the local maximum value 74 larger than the local maximum point 73, a possibility of estimating an excessively large intensity of noise is reduced.

3. Second Embodiment

Figure 14A:
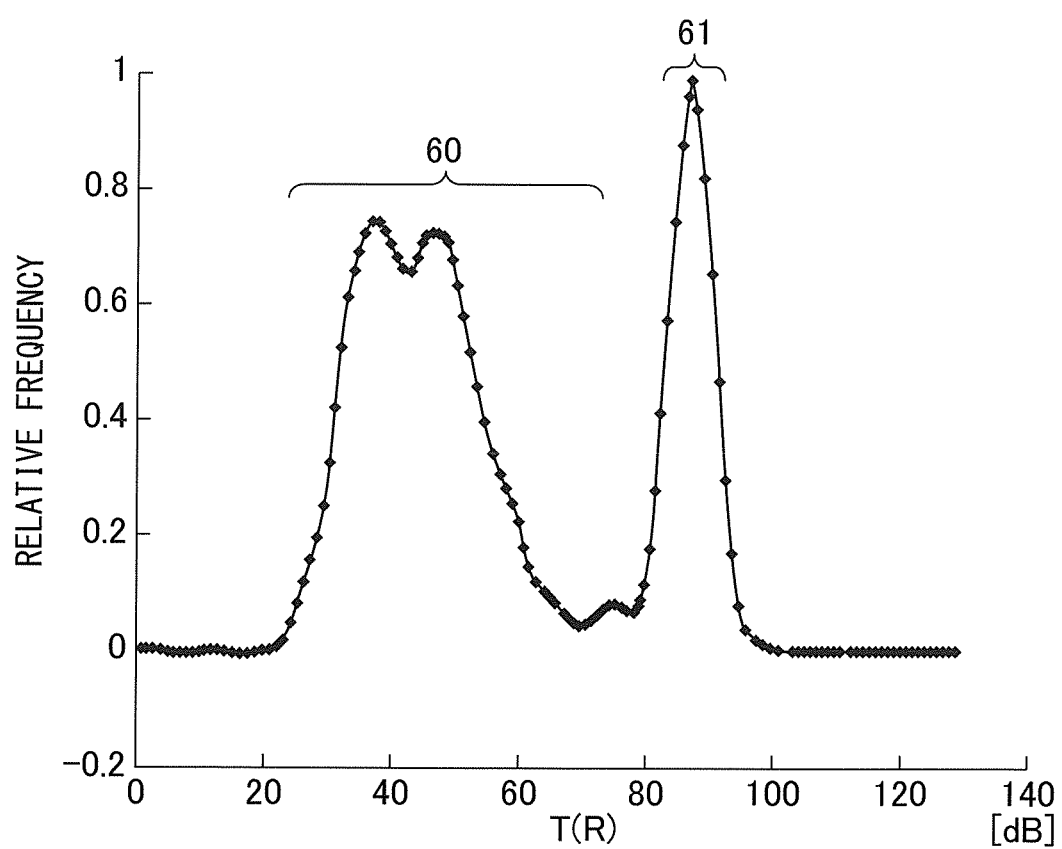
FIG. 14A is a chart illustrating a fifth example of a histogram of frequency distributions of relative values.
Figure 15:
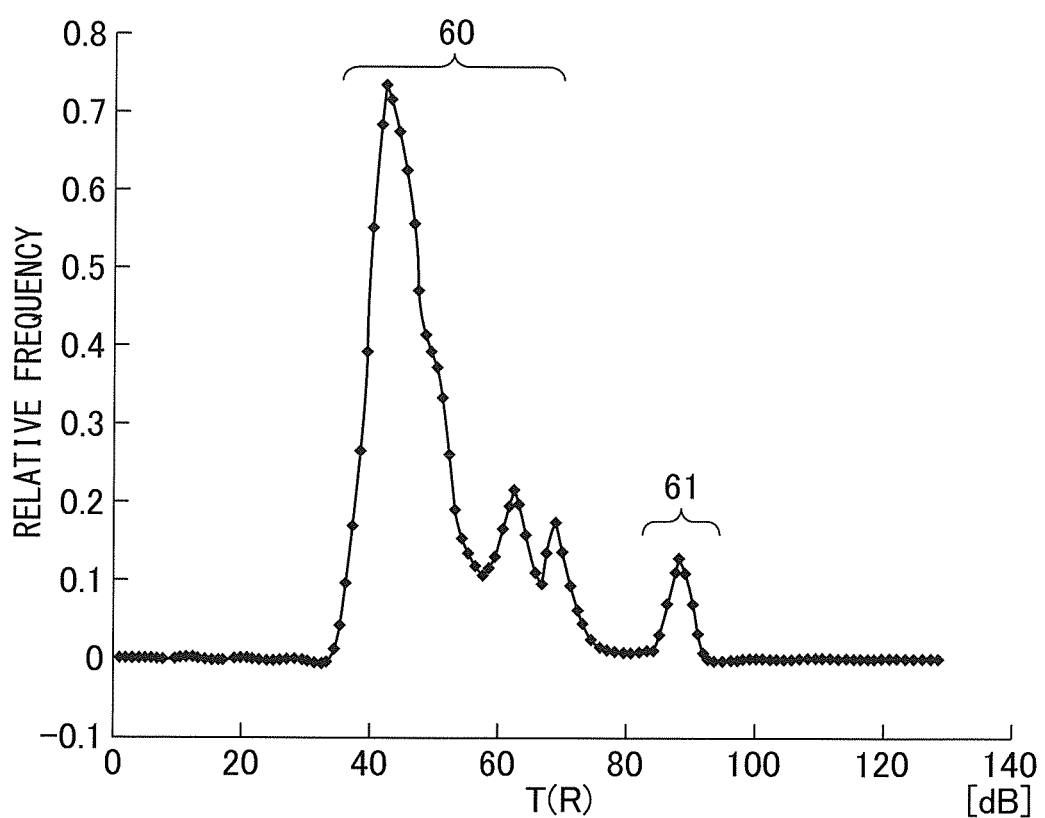
FIG. 15 is a chart illustrating a seventh example of a histogram of frequency distributions of relative values.

FIG. 14A, FIG. 14B, and FIG. 15 are charts illustrating fifth, sixth, and seventh examples of a histogram of frequency distributions of relative values, respectively. These histograms illustrate frequency distributions of relative values calculated in the case where the same input image is divided into divided images I(R) with different sizes. FIG. 14A illustrates a histogram in the case of the divided image I(R) having a size of 10 pixels×10 pixels. FIG. 14B illustrates a histogram in the case of the divided image I(R) having a size of 30 pixels×30 pixels. FIG. 15 illustrates a histogram in the case of the divided image I(R) having a size of 50 pixels×50 pixels.

As the divided image I(R) becomes larger and a character distance between characters contained in an input image becomes narrower, the chance of the divided image I(R) containing character pixels increases. Therefore, as illustrated in the histograms of FIG. 14A, FIG. 14B, and FIG. 15, as the divided image I(R) becomes larger, frequencies of relative values of an area containing only background area pixels (frequencies of the distribution 61) decrease. Further, when a size of the divided image I(R) is larger than the character distance of the input image, an area containing only background area pixels disappears. Therefore, the image processing unit 16 detects the character distance between characters contained in the input image and then adjusts a dividing size dividing the input image in accordance with the detected character distance.

Figure 16:
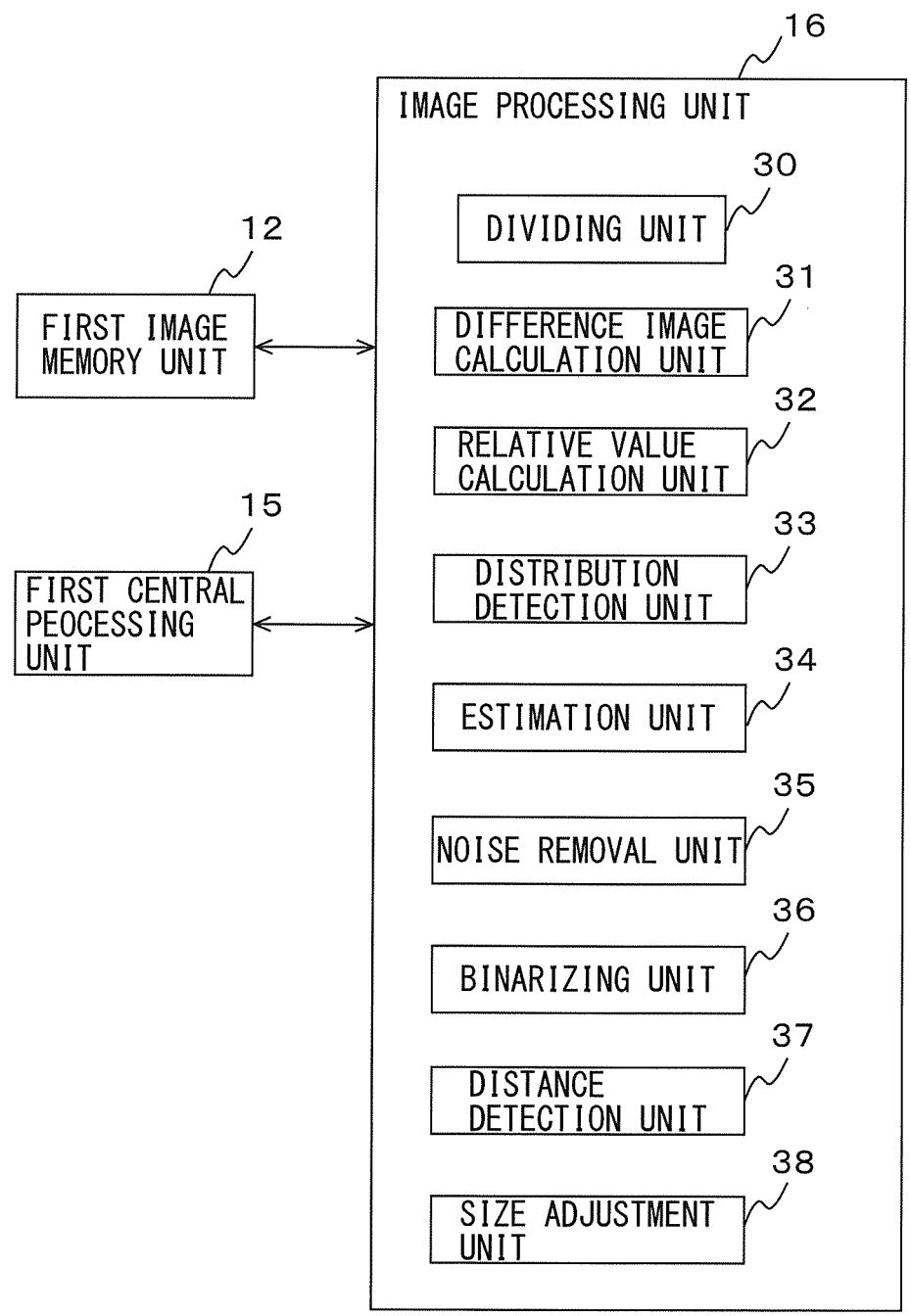
FIG. 16 is a diagram illustrating a second example of the functional configuration of the image processing unit.

FIG. 16 is a diagram illustrating a second example of the functional configuration of the image processing unit 16. The same reference signs as those used in FIG. 2 will be assigned to the same constituent elements as those of FIG. 2, and description of the same functions will be omitted. The image processing unit 16 includes a distance detection unit 37 and a size adjustment unit 38.

The distance detection unit 37 detects the character distance between characters contained in the input image. One example of detection processing of the character distance using the distance detection unit 37 will be described below. However, the following detection processing is merely an example and the distance detection unit 37 may detect the character distance using any other detection method.

Figure 17A:
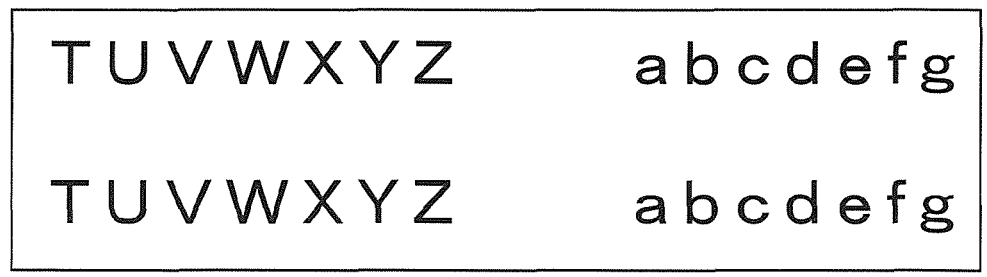
FIG. 17A is a view illustrating an example of a binarized image.

Initially, the distance detection unit 37 resizes the input image to a size suitable for processing and then removes a noise using a noise removal filter. The distance detection unit 37 binarizes the input image after noise removal to obtain a binarized image. FIG. 17A is a view illustrating an example of the binarized image.

Figure 17B:
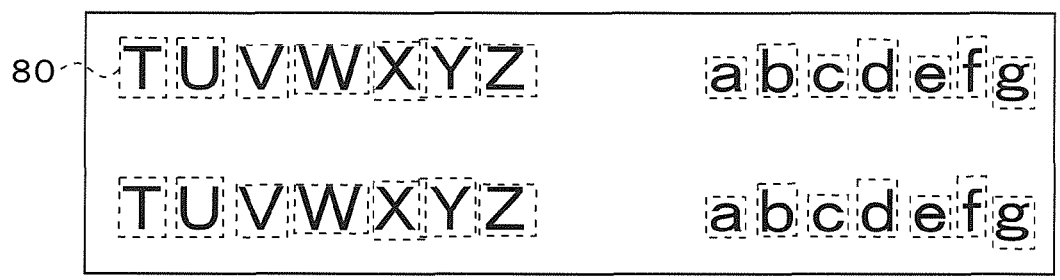
FIG. 17B is a view illustrating an example of blocks detected as a binarized image.
Figure 17C:
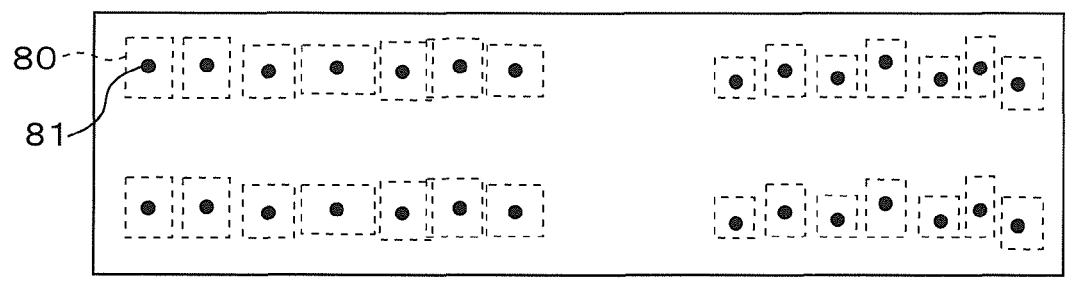
FIG. 17C is a view illustrating an example of center coordinates of the blocks.

The distance detection unit 37 labels the binarized image in order to detect a block 80 containing continuous pixels as a character. FIG. 17B is a view illustrating an example of the block 80 detected as a binarized image. The distance detection unit 37 detects center coordinates 81 of each block 80. FIG. 17C is a view illustrating an example of center coordinates 81 of the block 80.

Figure 17D:
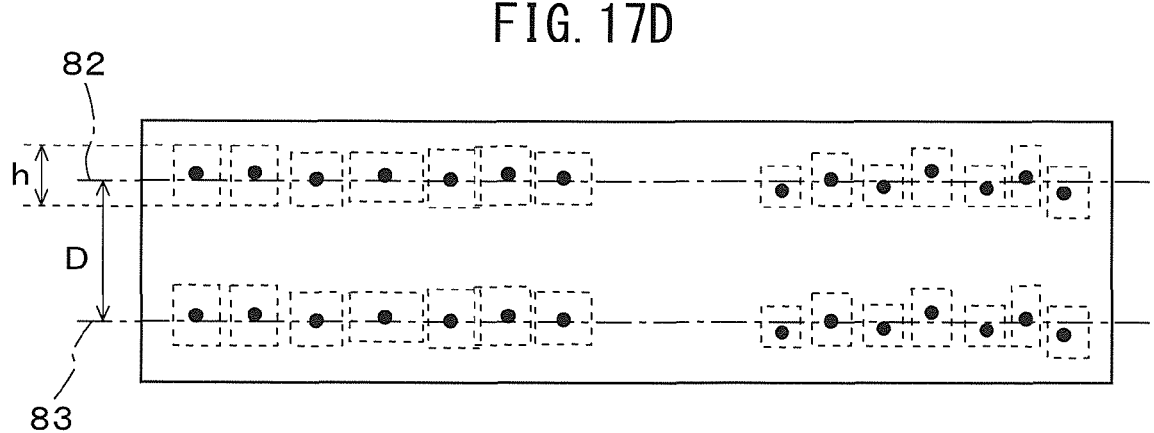
FIG. 17D is a view illustrating an example of approximate straight lines connecting the center coordinates.

The distance detection unit 37 detects approximate straight lines 82 and 83 connecting respective center coordinates. FIG. 17D is a view illustrating an example of the approximate straight lines 82 and 83 connecting center coordinates. The distance detection unit 37 detects, as the character distance, a length obtained by subtracting a height h of the block from a distance D between the approximate straight lines 82 and 83.

Refer to FIG. 16. The size adjustment unit 38 adjusts a dividing size of W and H upon dividing an input image into divided images I(R) in accordance with a character distance detected by the distance detection unit 37. The size adjustment unit 38 adjusts the dividing size of W and H so as to be at least smaller than the character distance. For example, the size adjustment unit 38 may set a value obtained by multiplying a character distance by a predetermined constant of less than 1 as the dividing size of W and H.

Note that the above-mentioned operations of the distance detection unit 37 and the size adjustment unit 38 are performed by cooperation of the first central processing unit 15 and respective constituent elements of the image reading apparatus 10 based on a program stored in the first storage unit 14.

Figure 18:
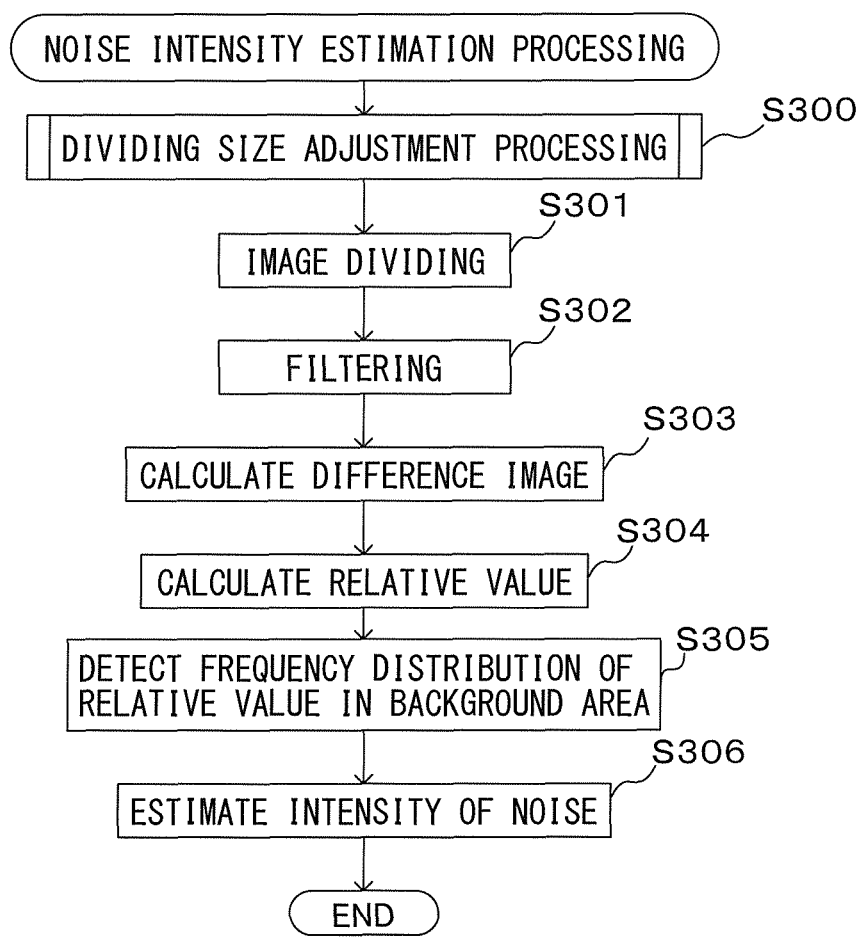
FIG. 18 is a flowchart illustrating a second example of noise intensity estimation processing.

FIG. 18 is a flowchart illustrating a second example of the noise intensity estimation processing executed in step S101 of FIG. 7. In step S300, the image processing unit 16 executes dividing size adjustment processing to adjust a dividing size of W and H in accordance with the character distance between characters contained in the input image. Steps S301 to S306 are the same as steps S200 to S205 having been described with reference to FIG. 8.

Figure 19:
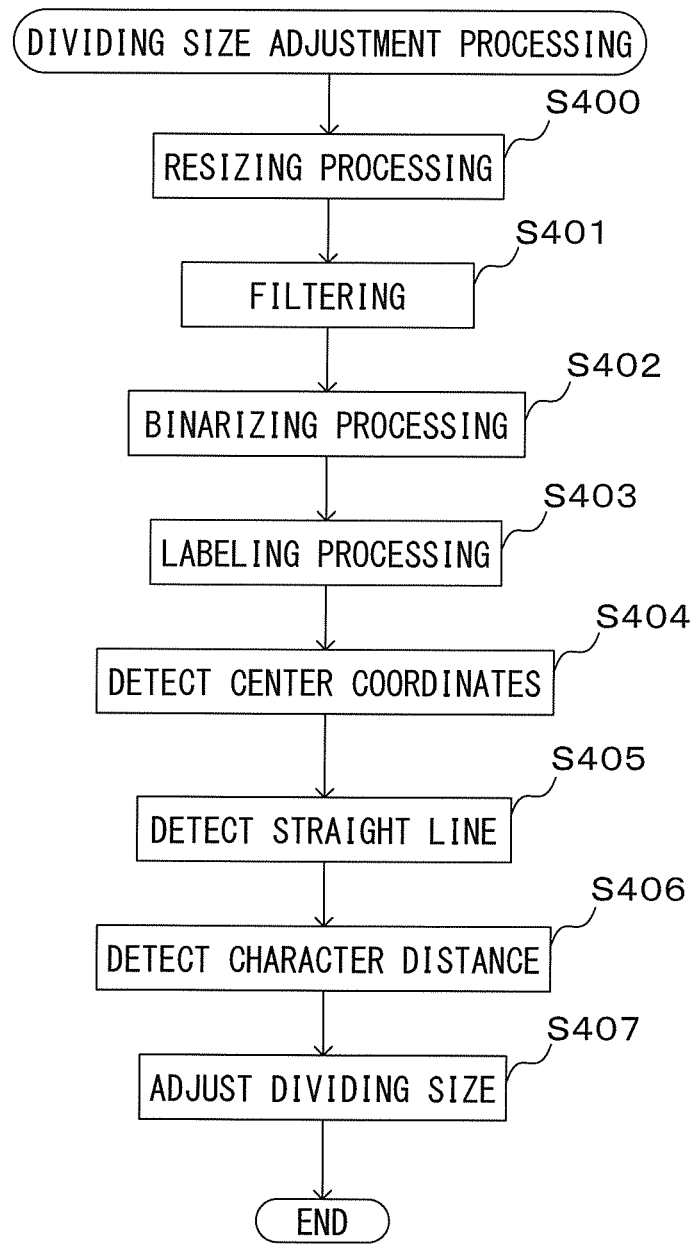
FIG. 19 is a flowchart illustrating an example of dividing size adjustment processing.

FIG. 19 is a flowchart illustrating an example of the dividing size adjustment processing executed in step S300 of FIG. 18. In step S400, the distance detection unit 37 resizes the input image to a size suitable for processing. In step S401, the distance detection unit 37 removes noise using a predetermined noise removal filter. In step S402, the distance detection unit 37 binarizes the input image after noise removal to obtain a binarized image.

In step S403, the distance detection unit 37 labels the binarized image to detect blocks 80 containing continuous pixels. In step S404, the distance detection unit 37 detects center coordinates 81 of respective blocks 80. In step S405, the distance detection unit 37 detects approximated straight lines 82 and 83 connecting the respective center coordinates.

In step S406, the distance detection unit 37 detects, as the character distance, a length obtained by subtracting a height h of the block from a distance D between the approximate straight lines 82 and 83. In step S407, the size adjustment unit 38 adjusts the dividing size of W and H in accordance with the character distance having been detected by the distance detection unit 37.

This embodiment makes it possible to adjust a dividing size upon dividing an input image in accordance with a character distance of an input image. Further, a possibility that frequencies of relative values of an area containing only background area pixels become excessively small in a frequency distribution of relative values T(R) can be reduced. Further, since the dividing size can be adjusted in accordance with the character distance of an input image, overcalculation due to a dividing size being excessively smaller than the character distance can be avoided.

The embodiments disclosed in the present specification possible to estimate an intensity of noise contained in an image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   a dividing circuit for dividing an input image into a plurality of divided images;
   a difference image calculation circuit for calculating a difference image between a divided image prior to noise removal and a divided image after noise removal with respect to each of the plurality of divided images;
   a relative value calculation circuit for calculating a relative value between a pixel intensity in the divided image prior to noise removal and a pixel intensity in the difference image with respect to each of the plurality of divided images;
a distribution detection circuit for detecting a frequency distribution of relative values in a background area of the input image, contained in frequency distribution of relative values calculated with respect to the plurality of divided images; and
an estimation circuit for estimating an intensity of noise so that the intensity of noise becomes larger, as the relative value a frequency of which is a local maximal value becomes smaller, in the frequency distribution of the relative values in the background area.

2. The image processing apparatus according to claim 1, wherein the distribution detection circuit determines a range of the relative values in the background area in accordance with a relative value among from the relative values calculated with respect to the plurality of divided images frequency of which is a smallest local minimum value.

3. The image processing apparatus according to claim 1, wherein
the input image contains a character formed with pixels having a pixel intensity lower than a pixel intensity of the background area; and
the distribution detection circuit estimates the intensity of noise in accordance with a first relative value, wherein a frequency of the first relative value is a local maximum value, and the first relative is greater than a second relative value among from the relative values calculated with respect to the plurality of divided images a frequency of which is a smallest local minimum value.

4. The image processing apparatus according to claim 1, further comprising a noise removal circuit for removing noise of the input image by noise removal processing selected in accordance with the intensity of noise estimated by the estimation circuit.

5. The image processing apparatus according to claim 4, further comprising a binarizing circuit for binarizing the input image where noise is removed by the noise removal circuit.

6. The image processing apparatus according to claim 1, further comprising:
a distance detection circuit for detecting a distance between characters contained in the input image; and
a size adjustment circuit for adjusting a size of the divided image in accordance with a detected distance between characters.

7. An image processing method comprising:
dividing an input image into a plurality of divided images;
calculating a difference image between a divided image prior to noise removal and a divided image after noise removal with respect to each of the plurality of divided images;
calculating a relative value between a pixel intensity in the divided image prior to noise removal and a pixel intensity in the difference image with respect to each of the plurality of divided images;
detecting a frequency distribution of relative values in a background area of the input image, contained in frequency distribution of relative values calculated with respect to the plurality of divided images; and
estimating an intensity of noise so that the intensity of noise becomes larger, as the relative value of which frequency is a local maximal value is smaller in the frequency distribution of the relative values in the background area.

8. A computer-readable, non-transitory medium storing a computer program for causing a computer to execute a process, the process comprising:
dividing an input image into a plurality of divided images;
calculating a difference image between a divided image prior to noise removal and a divided image after noise removal with respect to each of the plurality of divided images;
calculating a relative value between a pixel intensity in the divided image prior to noise removal and a pixel intensity in the difference image with respect to each of the plurality of divided images;
detecting a frequency distribution of relative values in a background area of the input image, contained in frequency distribution of relative values calculated with respect to the plurality of divided images; and
estimating an intensity of noise so that the intensity of noise becomes larger, as the relative value a frequency of which is a local maximal value becomes smaller, in the frequency distribution of the relative values in the background area.

* * * * *